(12) United States Patent
Kirschbaum et al.

(10) Patent No.: US 12,161,945 B2
(45) Date of Patent: Dec. 10, 2024

(54) MIRROR WEDGE ILLUSION SYSTEM AND METHOD

(71) Applicant: Universal City Studios LLC, Universal City, CA (US)

(72) Inventors: Ilana Kirschbaum, Orlando, FL (US); Timothy J. Eck, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 360 days.

(21) Appl. No.: 17/673,398

(22) Filed: Feb. 16, 2022

(65) Prior Publication Data

US 2022/0266158 A1 Aug. 25, 2022

Related U.S. Application Data

(60) Provisional application No. 63/152,173, filed on Feb. 22, 2021.

(51) Int. Cl.
| | | |
|---|---|---|
| *A63G 31/16* | (2006.01) | |
| *G02B 5/08* | (2006.01) | |
| *G02B 30/40* | (2020.01) | |
| *G09F 13/32* | (2006.01) | |

(52) U.S. Cl.
CPC .............. *A63G 31/16* (2013.01); *G02B 5/08* (2013.01); *G02B 30/40* (2020.01); *G09F 13/32* (2013.01)

(58) Field of Classification Search
CPC ..... A63G 31/16; A63J 5/00; A63J 5/02; A63J 5/021; C03C 17/02; G02B 5/0808
USPC ................................................. 472/57–28, 63
See application file for complete search history.

(56) References Cited

U.S. PATENT DOCUMENTS

| | | | |
|---|---|---|---|
| 5,619,375 A | 4/1997 | Roberts et al. | |
| 6,065,840 A | 5/2000 | Caskey et al. | |
| 2013/0208375 A1 | 8/2013 | Krasnov et al. | |
| 2020/0096682 A1 | 3/2020 | Teshima et al. | |
| 2020/0211283 A1* | 7/2020 | Krauthamer | A63J 5/02 |

OTHER PUBLICATIONS

Theme Park Review, "Monsters Inc Ride and Go Seek POV Tokyo Disneyland Japan Darkride Attraction", https://youtu.be/PEdM9gpWAul?t=212, 1 page, Jun. 26, 2011.
PCT/US2022/017305 Invitation to Pay Additional Fees mailed Jul. 18, 2022.
PCT/US2022/017305 International Search Report and Written Opinion mailed Sep. 8, 2022.

* cited by examiner

*Primary Examiner* — Kien T Nguyen
(74) *Attorney, Agent, or Firm* — Fletcher Yoder, P.C.

(57) ABSTRACT

A dual-surfaced mirror for a mirror wedge illusion. The dual-surfaced mirror includes a reflective material layer, a thin glass layer overlaying a front surface of the reflective material, a dark mask layer overlaying a back surface of the reflective material, and a thick glass support layer coupled to the dark mask layer.

20 Claims, 3 Drawing Sheets

MIRROR WEDGE ILLUSION SYSTEM AND METHOD

CROSS-REFERENCE TO RELATED APPLICATIONS

This application claims priority to and the benefit of U.S. Provisional Application No. 63/152,173, entitled "Mirror Wedge Illusion System and Method," filed Feb. 22, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Mirrors may be used in an amusement attraction to provide special effects. For example, mirrors can be used to provide illusions in an amusement attraction that cause a viewer to think they are seeing aspects of a scene that are actually reflections. Traditional mirror illusions (e.g., an illusion referred to as the floating door illusion) include mirrors that are framed along edges of the mirrors to keep the mirrors from being readily distinguishable by a guest in the amusement attraction. In a floating door illusion, for example, mirrors may be arranged to make a door, which leads into a room, appear to a viewer as though the door is floating (and essentially without associated exterior walls) even though the interior of the room is visible through the door. In such an illusion, the frames of the door may serve to hide the nature of the mirrors by hiding the edges of the mirrors, and, thus, help maintain the mirror illusion. However, it is now recognized that employing mirrors without framing edges of the mirrors make the edges of the mirrors quite visible and reveals the nature or basis of the illusion to an intended audience. When the basis of the illusion is readily apparent to the intended audience, the illusion may be referred to as broken, and a broken illusion is of limited entertainment value. Accordingly, it is now recognized that improved systems and methods for providing mirror illusions are desirable.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a dual-surfaced mirror includes a reflective material layer, a thin transparent layer overlaying a front surface of the reflective material layer, a dark mask layer overlaying a back surface of the reflective material layer, and a support layer coupled to the dark mask layer.

In an embodiment, a mirror wedge system includes a first mirror portion defining a first trapezoidal wall of the mirror wedge and a second mirror portion defining a second trapezoidal wall of the mirror wedge, and an apex of the mirror wedge at which the first mirror portion and the second mirror portion join. The first mirror portion and the second mirror portion each comprise a dual-surfaced mirror including a reflective material layer, a thin transparent layer overlaying a front surface of the reflective material layer, a dark mask layer overlaying a back surface of the reflective material layer, and a support layer coupled to the dark mask layer.

In an embodiment, a mirror wedge illusion system includes a plurality of walls arranged as faces of a portion of an n-gon prism and a mirror wedge. The plurality of walls comprises front surfaces that cooperate to define a concavity of the portion of the n-gon prism. The mirror wedge extends from a portion of the front surfaces into the concavity and toward an apex edge of the mirror wedge. The mirror wedge includes a first mirror side and a second mirror side coupled together at the apex edge. The first mirror side and the second mirror side include a reflective material layer, a thin glass layer overlaying a front surface of the reflective material layer, a dark mask layer overlaying a back surface of the reflective material layer, and a thick glass support layer coupled to the dark mask layer. The mirror wedge is configured to reflect a portion of the one or more walls to provide an illusion of the mirror wedge being a part of the plurality of walls.

In an embodiment, a method of manufacturing a dual-surface mirror is provided. The method includes assembling a dark mask layer on a support layer, a reflective material layer on a side of the dark mask layer opposite the support layer, and a thin transparent layer on a side of the reflective layer opposite the dark mask layer. This method may include vacuum sputtering a deposit to provide the thin transparent layer onto the side of the reflective layer opposite the dark mask layer. Further, the thin transparent layer, which may include a thin glass layer, may be deposited across an interface between two mirror portions.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
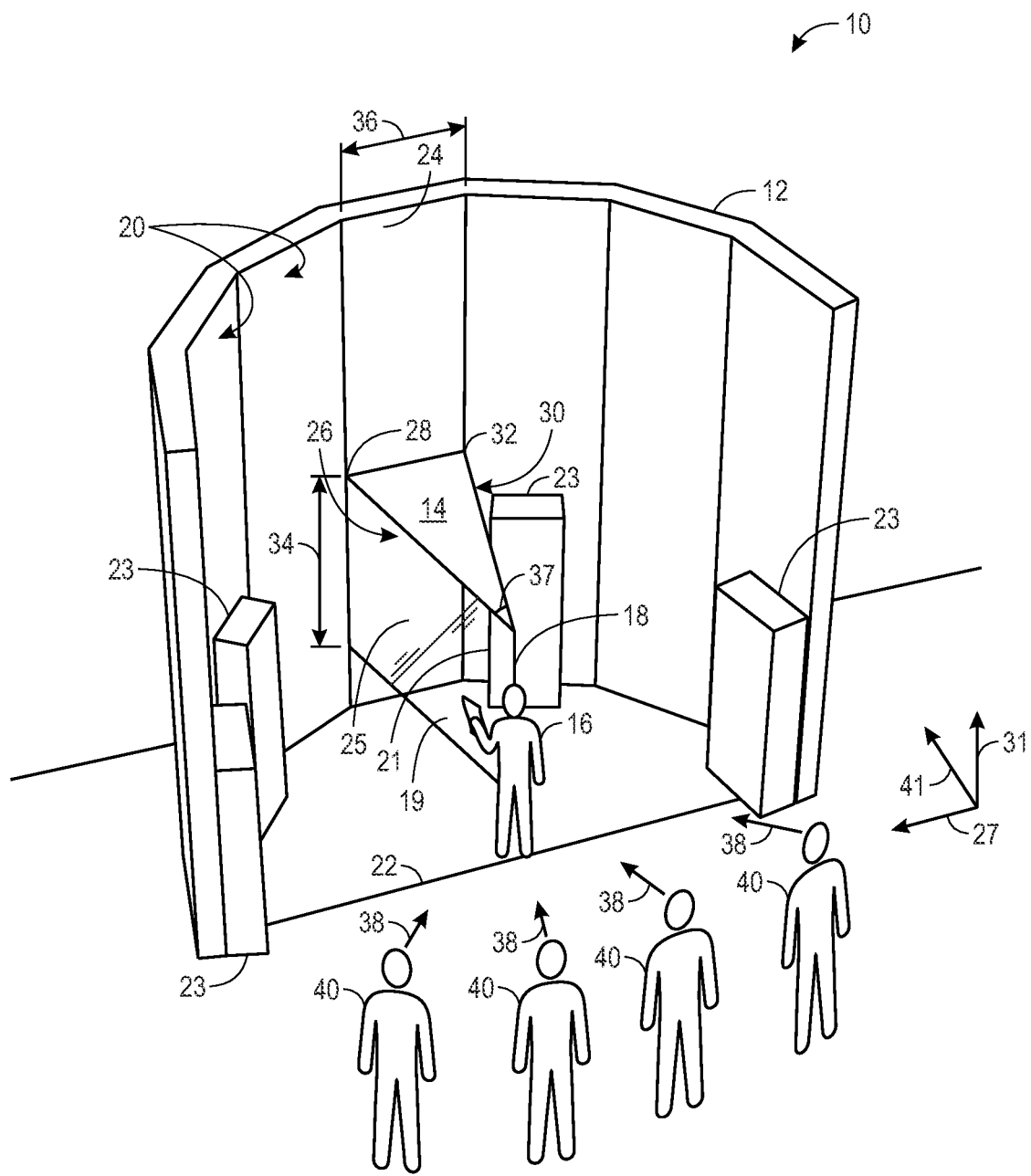
FIG. 1 is a schematic perspective view of a mirror wedge illusion system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques disclosed herein relate to special effects that employ mirrors to create illusions. Present embodiments can be employed to create intriguing imagery, hide functional aspects of a show, and so forth. More specifically, present embodiments are directed to mirror wedge illusions, which expand beyond traditional mirror effects in functionality. Specifically, present embodiments are directed systems and methods for providing mirror wedge illusions via dual-surfaced mirrors. Unlike a first surface mirror, which is generally defined to include a silver layer on a black backing mask disposed on a glass substrate, a dual surface mirror includes a thin transparent layer disposed over a reflective layer, which is disposed over a dark mask layer on a support. The thin transparent layer, which may be only tenths of a micrometer or a few thousandths of an inch thick, provides protection for the reflective layer while also limiting visibility of an edge or seam where two mirror surfaces interface. In an embodiment, benefits of the thin transparent layer may be enhanced by providing the thin transparent layer as a continuous layer over an edge between two mirror surfaces.

A mirror wedge illusion may include a mirror wedge that is configured to reflect objects, such that the mirror wedge does not appear to an observer as a mirror wedge, but rather, as the objects themselves (e.g., a continuation of a wall). For example, a mirror wedge illusion may be set up as part of an amusement attraction to create a visual impression (e.g., an illusion of a prop floating in midair). The mirror wedge illusion may also be used to hide objects such as control lines within the mirror wedge and behind a prop such that the prop appears to a guest of an amusement attraction to move independently without noticeable control lines coupled to the prop.

Various types of mirrors may be used in a mirror wedge illusion system, in accordance with present embodiments. For example, a standard mirror may be used in a mirror wedge illusion system. The standard mirror may include a thick glass support layer as a top surface of the standard mirror. A reflective material layer may overlay a back surface of the thick glass support layer and a dark mask layer may overlay a back surface of the reflective material layer. However, the standard mirror may be unsuitable to maintain the mirror wedge illusion under certain conditions. For example, edges of standard mirrors may be exposed and beveled in a way that ends of the standard mirrors come together to form a wedge, but the depth of the thick glass layer, which is the top layer of the standard mirror, may still be readily visible by a guest of a mirror wedge illusion system, thus breaking the mirror wedge illusion. Also, a front surface mirror may be used in a mirror wedge illusion system, in accordance with present embodiments. The front surface mirror (also referred to as a first surface mirror) may include a reflective material layer as a top surface, a dark mask layer overlaying a back surface of the reflective material layer, and a thick glass support layer overlaying a back surface of the dark mask layer. However, the front surface mirror alone may not be maintainable in an amusement attraction setting due to elemental exposure of the reflective material layer on the top surface of the front surface mirrors. Accordingly, mindful of the drawbacks of various mirrors, the disclosed techniques include dual-surfaced mirrors that facilitate operational aspects of the mirror wedge illusion system.

Specifically, the disclosed techniques include utilizing a dual-surfaced mirror to form a mirror wedge of a mirror wedge illusion system. For example, the mirror wedge illusion may include the dual-surfaced mirrors in a wedge configuration and positioned to reflect scenery (e.g., walls) such that the dual-surfaced mirrors appear to a guest of an amusement attraction as the reflected scenery rather than as mirrors. As will be appreciated by one of ordinary skill in the art, the mirrors of the mirror wedge illusion system could be positioned to make reflected walls appear to a viewer as extensions of adjacent walls. For example, the reflected walls in conjunction with the walls themselves may appear to form a room or portion of a room. Thus, the mirrors of the mirror wedge illusion system may create an illusion of open space. A dual-surfaced mirror includes a reflective material layer, a thin transparent layer (e.g., a thin glass layer) overlaying a front surface of the reflective material layer, a dark mask layer overlaying a back surface of the reflective material layer, and a support layer (e.g., a thick glass support layer) coupled to the dark mask layer. The thin transparent layer is the top layer of the dual-surfaced mirror, and is followed respectively by the reflective material layer, the dark mask layer, and the support layer. The dual-surfaced mirror is different than a standard mirror or a front surfaced mirror. For example, unlike a front surfaced mirror, which includes a reflective material layer such as silver or aluminum being the top layer of the front surfaced mirror, the dual-surface mirror includes a thin transparent layer (e.g., thin glass) being the top layer of the dual-surfaced mirror. The thin transparent layer of the dual-surfaced mirror may reduce maintenance and preserve service life of the front portion of the dual-surfaced mirror.

Turning to the drawings, FIG. 1 is a perspective view of a mirror wedge illusion system 10, in accordance with an embodiment of the present disclosure. The mirror wedge illusion system 10 may be part of an amusement attraction in an amusement park setting. The mirror wedge illusion system 10 includes a plurality of walls 12, a mirror wedge 14, and a prop 16 (e.g., an animated figure) located near an apex edge 18 of the mirror wedge 14. The mirror wedge 14 is configured to reflect at least a portion of the plurality of walls 12 to provide a mirror wedge illusion. The mirror wedge illusion may include the reflected images of the mirror wedge 14 appearing to be in alignment with and located along the plurality of walls 12, such that the mirror wedge 14 is not detected by a guest (e.g., an observer) of the mirror wedge illusion system 10.

Aspects of the mirror wedge illusion system 10 will be discussed further below. Geometric relationships facilitate operation of this mirror illusion. Accordingly, to facilitate discussion, reference is made to various axes and geometric relationships between features of the wedge illusion system 10. However, it should be noted that such references should not be interpreted as necessarily requiring a rigid mathematical relationship. For example, reference to a structure being parallel to another structure should be interpreted in context (e.g., as generally in parallel) and not as a perfect mathematical relationship.

The mirror wedge illusion may operate based on optics and geometric characteristics related to an n-gon (e.g., multi-sided regular closed polygon) and/or an n-gon prism. In other embodiments, curves may also be employed. However, to facilitate discussion, examples related to an n-gon prism are provided. A basic premise of the mirror wedge illusion is that n-gon sides are angled to be reflected by a mirror wedge such that the reflected angle is aligned with the wall behind the mirror wedge. For example, a mirror wedge with a wall intersecting at 30° will have a reflected wall that corresponds with a real wall that is −30° into the mirror. As such, the reflected wall given by the mirror wedge appears to be continuous with the reflected wall and located along the real wall. Utilizing consistent patterns on the walls can create improved visual consistency.

With the foregoing in mind, the plurality of walls 12 are arranged as faces of a portion of an n-gon prism (e.g., a 14-gon prism, a 16-gon prism). The plurality of walls 12 include front surfaces 20 (e.g., walls) that define a concavity 22 of the portion of the n-gon prism. The front surfaces 20 may be respectively aligned as sides or faces of the n-gon prism. Each front surface 20 of the plurality of walls 12 is angled with respect to an adjacent front surface. Angling the front surfaces 20 of the plurality of walls 12 may allow for the mirror wedge illusion to be maintained for a plurality of guest viewing angles.

In the illustrated embodiment, the mirror wedge 14 extends from one or more front surfaces 24 of the plurality of walls 12 and into the concavity 22. With respect to the plurality of walls 12 (or more specifically the front surface(s) 24 adjacent the mirror wedge), a corresponding width generally lies along an axis parallel to an axis 27, which is depicted in FIG. 1. The mirror wedge 14 extends in a direction transverse to this width and away from the front surface(s) 24. The mirror wedge 14 includes a first mirror portion 26 (e.g., first mirror side) and a second mirror portion 30 (e.g., second mirror side) that extend away from the front surface(s) 24 and into the concavity 22. As shown, the first mirror portion 26 defines a first trapezoidal wall of the mirror wedge 14 and extends into the concavity 22 from a first edge 28 of the mirror wedge 14 that is adjacent the front surface(s) 24. Also as shown, the second mirror portion 30 defines a second trapezoidal wall of the mirror wedge 14 and extends into the concavity 22 from a second edge 32 of the mirror wedge 14 that is adjacent the front surface(s) 24. The first mirror portion 26 and the second mirror portion 30 extend generally toward a center of the n-gon prism and meet at the apex edge 18, which extends generally parallel to illustrated axis 31. This arrangement of the first mirror portion 26 and the second mirror portion 30 results in the mirror wedge 14, as a whole, generally extending into the concavity 22 along an axis parallel to illustrated axis 41.

A longitudinal length of the first mirror portion 26 and the second mirror portion 30 (extending from the front surface(s) 24 into the concavity 22) may be approximately equal to an external radius of a hypothetical n-gon prism. It should be noted that although an n-gon prism is a closed shape, only a portion of the n-gon prism (e.g., a portion of faces) may be physically present and utilized as part of the mirror wedge illusion system 10. Accordingly, in the illustrated embodiment, the plurality of walls 12 form a portion of the n-gon prism. Various props (e.g., pictures, patterns, objects, lighting) may be coupled to or provided on the plurality of walls 12. In the illustrated embodiment, the props 23 represent various props in accordance with present embodiments. In the perspective view given in FIG. 1, all of the reflected angles of the reflected portion of the n-gon prism on the mirror wedge 14 are aligned with expected angles of an opposing portion of the n-gon prism. Accordingly, reflected images are aligned on the mirror wedge 14 with opposing physical structures such that the mirror wedge 14 may not be detected by a guest. Indeed, as illustrated, the reflection 19 on the mirror wedge 14 is aligned with the angle of the floor expected behind the mirror wedge 14, the reflection 21 is aligned with the prop 23 behind the mirror wedge 14, and the reflection 25 is aligned with the angle of a wall of the plurality of walls 12 behind the mirror wedge 14.

As previously noted, the first mirror portion 26 and the second mirror portion 30 are coupled (e.g., joined) at the apex edge 22 of the mirror wedge 14. The apex edge 22 may be at a center axis of the n-gon prism and generally aligned in parallel to the axis 31. The mirror wedge 14 is configured to reflect at least a portion of the plurality of walls 12 such that the reflected portion aligns with internal angels of the n-gon prism, thus giving the illusion to a guest that the reflected portion is located along the plurality of walls 12 and that no mirror wedge 14 is present. In this way, the mirror wedge 14 may provide an illusion of the mirror wedge 14 being absent and not taking up space. As an example, a pattern on a wall of the plurality of walls 12 that is within a reflection zone of the mirror wedge 14 may be incident onto the mirror wedge 14 and reflected from the mirror wedge 14 into a line of sight of a guest. Thus, the mirror wedge 14 and the plurality of walls 12 are arranged such that the reflected walls given by the mirror wedge 14 appear to be located along the plurality of walls 12 rather than in the concavity 22 created by the plurality of walls 12. Indeed, the mirror wedge 14 may not appear to exist to a guest observing the mirror wedge illusion system. That is, the mirror wedge 14 is configured such that, for a plurality of guest viewing angles, reflections created by the mirror wedge 14 appear to be positioned along the front surfaces 20 of the plurality of walls 12. In this way, the observer may observe a continuous pattern on the plurality of walls 12, even a pattern that is not broken by the presence of the mirror wedge 14 that is in reality located in a line of sight of the guest.

In the illustrated embodiment, a length 34 of a back of the mirror wedge 14 (transverse to a base of a triangle formed by the mirror wedge 14) extends generally parallel to the axis 31 along a height of the front surface 24 of the plurality of walls 12. Also, in the illustrated embodiment, the length 34 of the back of the mirror wedge 14 is shorter than the height of the wall of the plurality of walls 12. The mirror wedge 14 may be held up by the plurality of walls 12 via structural support features (e.g., screws, nuts). Further, in the illustrated embodiment, a width 36 of the back of the mirror wedge 14 (the base of the triangle formed by the mirror wedge 14) is approximately equal to a width of the front surface 24 of a particular segment of the plurality of walls 12. In addition, a width (the dimension extending from the plurality of walls 12 into the concavity 22) of each of the first mirror portion 26 and the second mirror portion 30 of the mirror wedge 14 may be less than or approximately equal to a radius (e.g., an external radius) of the hypothetical n-gon prism.

In the illustrated embodiment, walls of the plurality of walls 12 are angled to compensate for the angle 37 of the mirror wedge 14. However, some embodiments may employ different angles (e.g., a squared room or even smoothly curved walls). Regardless, the mirror wedge illusion may be maintained and designed for a plurality of guest viewing angles 38 corresponding to positions of the guests 40 around the mirror wedge illusion system 10 throughout a viewing timeframe. For example, in an amusement ride including the mirror wedge illusion system 10, a ride vehicle of the amusement ride may be configured to move a guest 40. As the guest moves, it may be desirable to maintain the mirror wedge illusion for each location that the guest occupies. In addition, the mirror wedge illusion may be maintained for a plurality of guest heights. Indeed, different guests 40 (e.g., adults, kids) may view the mirror wedge illusion system 10 from different heights parallel to the axis 31. To maintain the mirror wedge illusion for the plurality of guest heights, a length of the apex edge 18 may be designed to accommodate various viewing angles along an axis parallel to the axis 31. Accordingly, to maintain the mirror wedge illusion, the geometry of the mirror wedge illusion system 10 may be configured by an attraction engineer based on the allowed guest viewing angles 38 for the amusement attraction.

In the illustrated embodiment, the first mirror portion 26 and the second mirror portion 30 are dual-surfaced mirrors. Accordingly, the top surface of the dual-surfaced mirrors are thin transparent layers. The thin transparent layers of the first mirror portion 26 and the second mirror portion 30 may be joined at the apex edge 18. In some embodiments, the dual-surfaced mirrors are manufactured by vacuum sputtering a thin glass layer onto a top layer of a front surface mirror (e.g., silver front mirror). In these cases, the thin glass layer helps reduce maintenance and preserve service life of the dual-surfaced mirror, without being readily noticeable to an observer of the mirror wedge illusion system 10.

The mirror wedge illusion system 10 also includes the prop 16 (e.g., animated figure) positioned proximate to the apex edge 18 of the mirror wedge 14. The prop 16 includes and/or is coupled to control lines for actuating the prop 16. The control lines are proximate to a position along the apex edge 18 and hidden by the mirror wedge 14. The control lines may emerge through an opening along the apex edge 18 behind the prop 16. The mirror wedge illusion system 10 is configured to hide the control lines behind the prop 16, such that the prop 16 may actuate without an observer detecting actuation equipment. The mirror wedge illusion system 10 can hide the control lines of the prop 16 because the mirror wedge 14 reflects the front surfaces 20, such that an observer observes reflected walls on the mirror wedge 14 appearing to be located along the plurality of walls 12, instead of detecting the mirror wedge 14 as an object in the concavity 22. Indeed, the mirror wedge is similar to being camouflaged as being a part of the plurality of walls 12 (e.g., the portion of the sides of the n-gon prism).

In the illustrated embodiment, the prop does not hide the full length of the apex edge 18. Instead, the prop 16 hides a portion of the apex edge 18 from a sight of a guest. It should be noted that additional props may be used to hide other portions of the apex edge 18. Indeed, the mirror wedge illusion system 10 may include additional props (e.g., stationary or actuatable) or designs configured to camouflage parts of the apex edge 18 such that the apex edge 18 appears to be a prop itself (e.g., a stream of water flowing over the apex edge).

Figure 2:
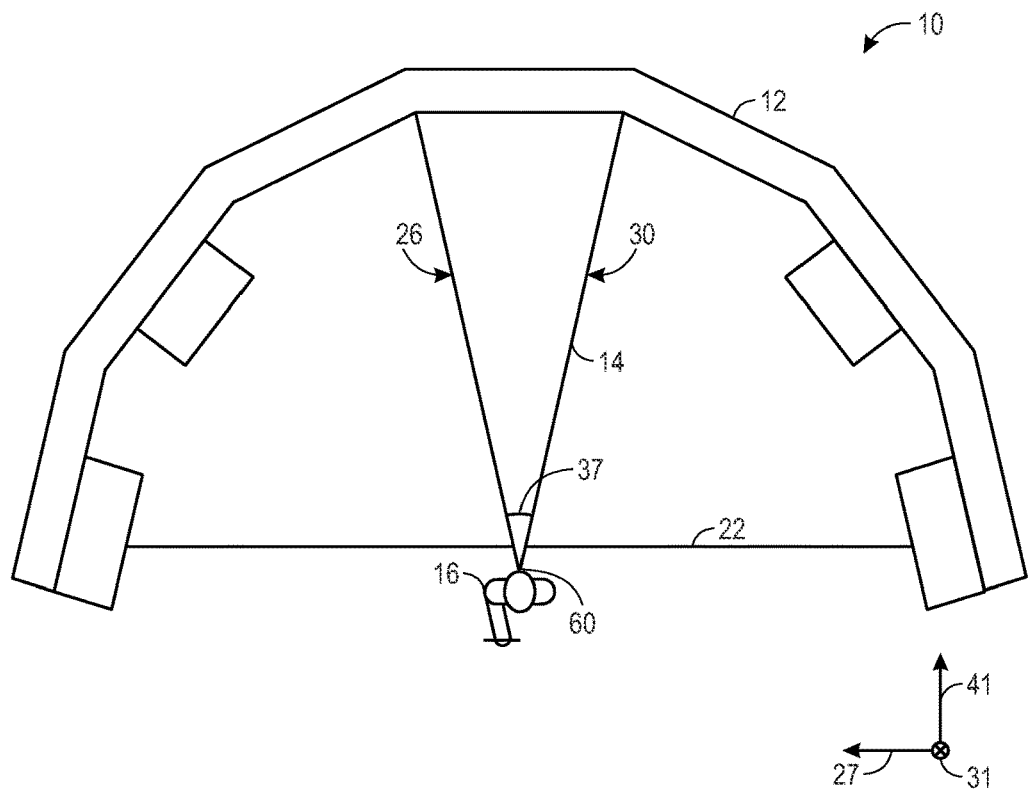
FIG. 2 is a schematic plan view of the mirror wedge illusion system of FIG. 1, in accordance with an embodiment of the present disclosure.

FIG. 2 is a schematic plan view of the mirror wedge illusion system 10 of FIG. 1. FIG. 2 illustrates the plurality of walls 12 arranged as a portion of an n-gon. As illustrated, the first mirror portion 26 (e.g., first surface) and the second mirror portion 30 (e.g., second surface) do not terminate in a frame such as a mirror frame. Instead, the first mirror portion 26 and the second mirror portion 30 join at a point 60, which represents the apex edge 18 viewed from overhead and which is positioned proximate the center or radius of the n-gon to provide desirable viewing angles. The first mirror portion 26 and the second mirror portion 30 may be joined at the apex edge 18 at a bevel or cut of the dual-surface mirrors of the first mirror portion 26 and the second mirror portion 30. However, the first mirror portion 26 and the second mirror portion 30 may also share all or a subset of the layers of the respective dual-surfaced mirrors. For example, at least outer and viewable layers (e.g., the thin transparent layer and the reflective layer) of the first mirror portion 26 and the second mirror portion 30 may be formed together to create a seamless coupling of the first mirror portion 26 and the second mirror portion at the apex edge 18.

Figure 3:
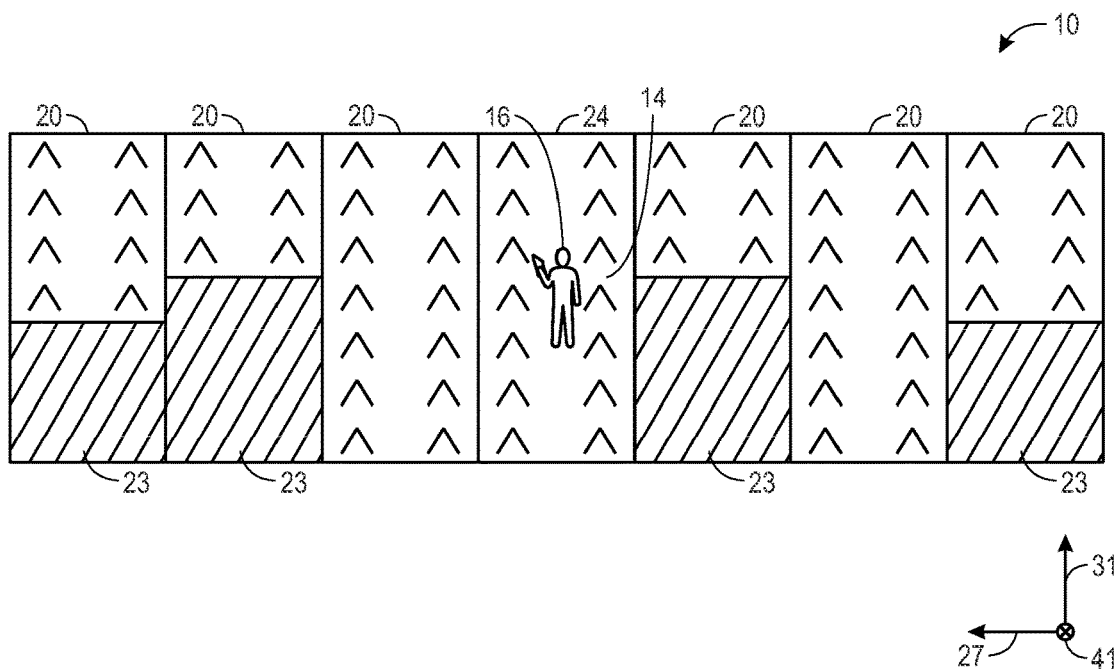
FIG. 3 is a schematic elevation view of the mirror wedge illusion system of FIG. 1, in accordance with an embodiment of the present disclosure.

FIG. 3 is a schematic elevation view of the mirror wedge illusion system 10 of FIG. 1. In the illustrated embodiment, which represents a view from a particular viewing perspective, the mirror wedge 14 is shown as appearing to be identical to the plurality of walls 12. Further, the mirror wedge 14 is configured to appear identical to the plurality of walls 12 from a variety of positions or perspectives. For example, the mirror wedge 14 may be positioned with respect to other aspects of the mirror wedge illusion system 10 such that, at every viewing point or angle that a guest in a ride vehicle of the amusement attraction passes through, the guest may view and experience the optical illusion provided by the mirror wedge illusion system 10. Indeed, at the designated viewing positions, the observer may not be able to readily detect the mirror wedge 14 due to the illusion. This facilitates implementation of the desired effect with a ride, which may include a large number of viewing positions. Further, the apex edge 18 facilitates providing an illusion that allows the prop 16, which is small relative to the mirror wedge 14, to appear as though floating or standing unsupported in the mirror wedge illusion system 10.

Figure 4:
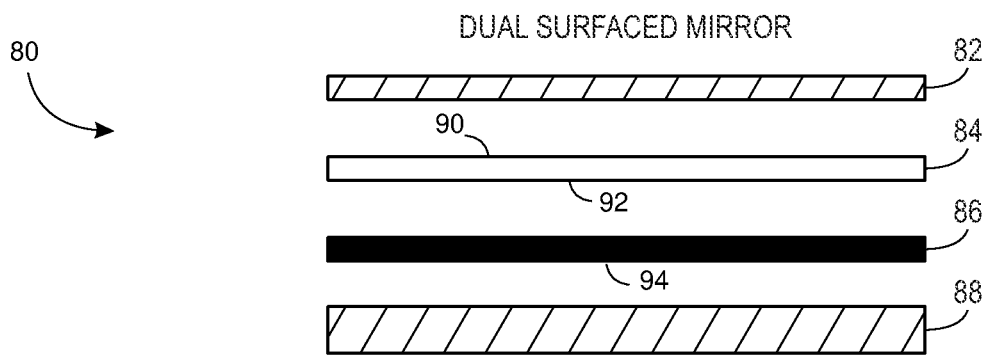
FIG. 4 is an exploded schematic cross-sectional view of a dual-surfaced mirror of the mirror wedge illusion system of FIG. 1, in accordance with an embodiment of the present disclosure.

The first mirror portion 26 and the second mirror portion 30 are dual-surfaced mirrors. FIG. 4 is an exploded view of layers of a dual-surfaced mirror 80 of the mirror wedge illusion system 10 of FIG. 1. The dual-surfaced mirror 80 includes a thin glass layer 82, a reflective material layer 84 (e.g., silver), a dark mask layer 86, and a thick glass support layer 88. The thin glass layer 82 and the thick glass support layer 88 may be replaced with other materials having desired properties (e.g., the thin glass layer 82 may be replaced with a thin transparent plastic layer and the thick glass support layer 88 may be replaced with a plastic panel). The thin glass layer 82 overlays a front surface 90 of the reflective material layer 84. The dark mask layer 86 overlays a back surface 92 of the reflective material layer 84. The thick glass support layer 88 is coupled to a back surface 94 of the dark mask layer 86. The thick glass support layer 88 may be thicker than the thin glass layer 82. The thin glass layer 82 may comprise a vacuum sputtered layer (e.g., vacuum sputter deposit). That is, the thin glass layer 82 may be a thin layer of vacuum sputtered glass. The thin glass layer 82 may assist in reducing maintenance and preserving service life of the dual-surfaced mirror 80. In some embodiments, the thin glass layer 82 is between 0.06 and 0.09 mm thick. The thickness of the thin glass layer 82 may be similar to a thickness of a human hair. In this way, the thin glass layer 82 may be virtually invisible to an observer of the mirror wedge illusion system 10. In some embodiments, the thin glass layer 82 is deposited on the first mirror portion 26 and the second mirror portion 30 at the same time or continuous process step to create a seamless texture for the apex edge 18.

In some embodiments, during a manufacturing period of the dual-surface mirror 80, the thick glass support layer 88 may be beveled or cut to specific angles before the other layers (e.g., substrates) on top of the thick glass support layer 88 are applied to ensure that tooling does not mar or break more delicate and visible layers on top of the thick glass support layer 88. This beveling or cutting may also facilitate joining two mirrors, such as the first mirror portion 26 and the second mirror portion 30, to form the mirror wedge 14. While at least some of the layers of the first mirror portion 26 and the second mirror portion 30 may be formed separately, using the same materials for each layer may provide consistency and maintenance benefits. For example, the materials forming the layers may behave consistently to avoid damage due to environmental changes. Also, the sandwich-like structure of the dual-surface mirror 80, including the thin glass layer 82 on the top surface of the dual-surfaced mirror 80 and the thick glass support layer 88 on a back of the dual-surfaced mirror 80, may facilitate expansion and contraction of the dual-surfaced mirror 80 at the same rate. This will help to keep the dual-surfaced mirror 80 from cracking with temperature fluctuations. It should be noted that, in some embodiments, the mirror wedge 14 may be formed as a single structure including providing shared layers for the first mirror portion 26 and the second mirror portion 30.

Figure 5:
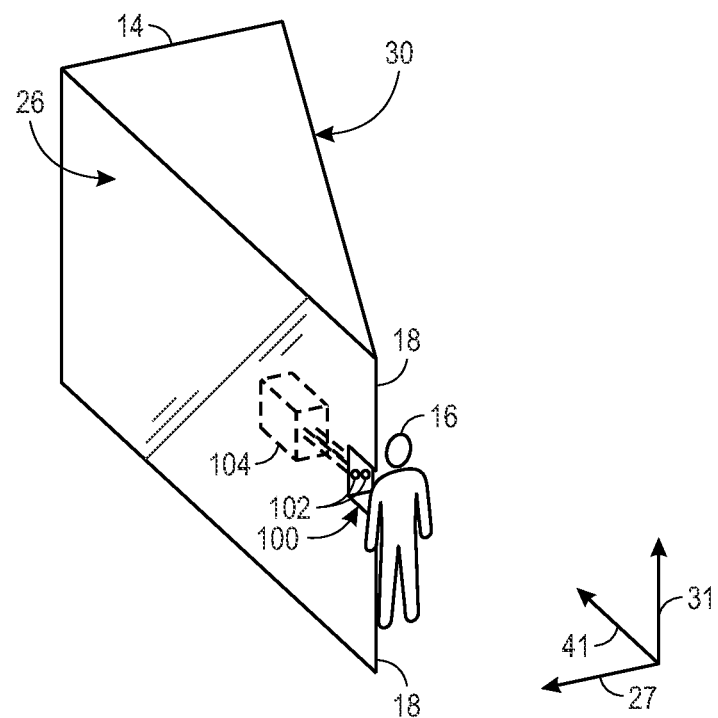
FIG. 5 is a schematic perspective view of a mirror wedge of a mirror wedge illusion system, in accordance with an embodiment of the present disclosure.

FIG. 5 is a perspective view of the mirror wedge 14, illustrating various features of the mirror wedge 14. As illustrated, an opening 100 exists near or through the apex edge 18 of the mirror wedge 14. In some embodiments, multiple openings may be included in the mirror wedge 14. The multiple openings may receive control lines 102 for controlling one or more additional props or other features. Via the opening 100, the prop 16 is coupled to control lines 102 that are configured to cause the prop 16 to perform various special effects based on instructions from an automation controller 104 (e.g., a programmable logic controller, a local controller, or a programmed computer), such as movement of the prop 16 (e.g., an animated character) in one or more directions. Using such an arrangement, the control lines 102 are hidden from an audience's view when the mirror wedge illusion system 10 is used in an amusement show. For example, the control lines 102 may be hidden from sight due to the presence of the prop 16 being in front of the opening 100 and by the mirror wedge 14. In the illustrated embodiment, a length of the apex edge 18 is longer than a height of the animated figure. In some embodiments, the length of the apex edge 18 may be approximately equal to or shorter than the height of the prop 16. In these embodiments, a lesser amount of the apex edge 18 may be observed by an observer.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A dual-surfaced mirror system for a mirror wedge illusion, the dual-surfaced mirror system comprising:
   a first surface of a first mirror portion and a second surface of a second mirror portion joined at an apex edge of a dual-surfaced mirror, wherein the dual-surfaced mirror comprises:
   a reflective material layer;
   a thin transparent layer overlaying a front surface of the reflective material layer;
   a dark mask layer overlaying a back surface of the reflective material layer; and
   a support layer coupled to the dark mask layer.

2. The dual-surfaced mirror system of claim 1, wherein the thin transparent layer comprises a vacuum-sputtered glass layer.

3. The dual-surfaced mirror system of claim 1, wherein the reflective material layer comprises silver and the dark mask layer comprises a black mask layer.

4. The dual-surfaced mirror system of claim 1, wherein the thin transparent layer is between 0.06 and 0.09 millimeters thick.

5. The dual-surfaced mirror system of claim 1, wherein the reflective material layer, thin transparent layer and dark mask layer are each respectively continuous over a bevel or cut in the support layer.

6. The dual-surfaced mirror system of claim 1, comprising an actuatable prop positioned at the apex edge of the dual-surfaced mirror and coupled with control lines that extend through the dual-surfaced mirror.

7. The dual-surfaced mirror system of claim 6, wherein the actuatable prop comprises an animated figure and the control lines are configured to provide signals for actuation of the animated figure from an automation controller.

8. The dual-surfaced mirror system of claim 1, wherein the first surface and the second surface join to define a portion of an acute prism.

9. A mirror wedge system, comprising:
   a first mirror portion defining a first trapezoidal wall of a mirror wedge;
   a second mirror portion defining a second trapezoidal wall of the mirror wedge; and
   an apex of the mirror wedge at which the first mirror portion and the second mirror portion join, wherein the first mirror portion and the second mirror portion each comprise a dual-surfaced mirror including:
   a reflective material layer;
   a thin transparent layer overlaying a front surface of the reflective material layer;
   a dark mask layer overlaying a back surface of the reflective material layer; and
   a support layer coupled to the dark mask layer.

10. The mirror wedge system of claim 9, comprising:
a plurality of walls arranged as faces of a portion of an n-gon prism, wherein a back of the mirror wedge is coupled to at least one wall of the plurality of walls, and wherein the mirror wedge is configured to reflect at least a portion of walls of the plurality of walls.

11. The mirror wedge system of claim 10, wherein a width of the back of the mirror wedge is approximately equal to a width of the at least one wall of the plurality of walls.

12. The mirror wedge system of claim 10, wherein the mirror wedge further comprises an opening along the apex and the opening is configured to receive a structure configured to support an animated prop.

13. The mirror wedge system of claim 9, wherein the thin transparent layer comprises a vacuum sputtered glass layer.

14. The mirror wedge system of claim 9, wherein the thin transparent layer is continuous across the apex.

15. A mirror wedge illusion system, comprising:
a plurality of walls arranged as faces of a portion of an n-gon prism, wherein the plurality of walls comprises front surfaces that cooperate to define a concavity of the portion of the n-gon prism; and
a mirror wedge extending from a portion of the front surfaces into the concavity and toward an apex edge of the mirror wedge, the mirror wedge comprising:
a first mirror side and a second mirror side coupled together at the apex edge, wherein each of the first mirror side and the second mirror side comprises:
a reflective material layer;
a thin glass layer overlaying a front surface of the reflective material layer;
a dark mask layer overlaying a back surface of the reflective material layer; and
a support layer coupled to the dark mask layer, wherein the mirror wedge is configured to reflect a portion of the plurality of walls to provide an illusion of the mirror wedge being a part of the plurality of walls.

16. The mirror wedge illusion system of claim 15, wherein the n-gon prism is at least a 10-gon prism.

17. The mirror wedge illusion system of claim 15, wherein the thin glass layer and the reflective material layer are continuous across the apex edge.

18. The mirror wedge illusion system of claim 15, comprising an animated prop coupled to a support extending through an opening proximate the apex edge.

19. The mirror wedge illusion system of claim 18, wherein a height of the apex edge of the mirror wedge is longer than a height of the animated prop.

20. A dual-surfaced mirror system for a mirror wedge illusion, the dual-surfaced mirror system comprising:
a reflective material layer;
a thin transparent layer overlaying a front surface of the reflective material layer, wherein the thin transparent layer comprises a vacuum-sputtered glass layer;
a dark mask layer overlaying a back surface of the reflective material layer; and
a support layer coupled to the dark mask layer.

* * * * *